United States Patent [19]

Jones

[11] Patent Number: 4,495,806

[45] Date of Patent: Jan. 29, 1985

[54] INDICATOR INSTRUMENTS

[75] Inventor: Maurice S. Jones, Cheltenham, England

[73] Assignee: Smiths Industries Public Limited Company, London, England

[21] Appl. No.: 479,395

[22] Filed: Mar. 28, 1983

[30] Foreign Application Priority Data

Apr. 2, 1982 [GB] United Kingdom ................ 8209770

[51] Int. Cl.³ .............................................. G01C 21/10
[52] U.S. Cl. ................... 73/182; 73/432 A; 116/DIG. 43
[58] Field of Search ................ 73/182, 178 R, 432 A; 116/DIG. 43

[56] References Cited

U.S. PATENT DOCUMENTS 2,783,650  3/1957  Street ....................................... 73/182
3,154,944  11/1964  Johanson ................................ 73/182
3,205,708  9/1965  Andresen, Jr. ............... 116/DIG. 43
3,465,583  9/1969  Molis ....................................... 73/182

Primary Examiner—Donald O. Woodiel
Attorney, Agent, or Firm—Pollock, Vande Sande & Priddy

[57] ABSTRACT

A Mach/airspeed indicator instrument has two pressure capsules each of which have a finger projecting from one face which is displaced by deflection of the capsule. Each finger is coupled to a respective arm that extends radially from respective shafts, so that displacement of a finger causes rotation of the respective shaft about its axis. Rotation of one shaft causes rotation of a Mach scale plate whereas rotation of the other shaft causes rotation of a pointer around an airspeed scale. The rear end of the Mach shaft is rotatably mounted at one end of a radially-extending lever that is in turn pivotally mounted close to its other end. The airspeed shaft is coupled with the Mach shaft by means of a link that extends between a plate fixed to the airspeed shaft and the lever. Rotation of the airspeed shaft thereby causes rotation of the lever and lateral displacement the Mach shaft about a pivot point at the end of the finger. This produces a rotational component about the axis of the Mach shaft that ensures linear displacement of the Mach scale plate.

13 Claims, 4 Drawing Figures

# INDICATOR INSTRUMENTS

BACKGROUND OF THE INVENTION

This invention relates to indicator instruments.

The invention is more particularly, but not exclusively, concerned with Mach/air-speed instruments where a display of both Mach number and air-speed are provided on the same instrument.

Aircraft air-speed indicator instruments commonly have a scale calibrated in knots that is non-linear along its range. The non-linearity arises from the behaviour of the pressure capsules used in the instruments. Whilst it is possible to convert the non-linear behaviour of the pressure capsules into a linear pointer displacement, it is, in some cases, desirable to have a non-linear operation. In practice, the lower end of the scale is expanded thereby enabling low speeds of up to about 200 knots to be read to a fairly high resolution. The scale for higher speeds is contracted, but since these do not need to be known so accurately this is not a disadvantage.

In a typical combined Mach/air-speed instrument, the air-speed scale is printed around a fixed dial face of the instrument and a pointer is rotated to indicate air-speed. The Mach number scale may be printed on a disc that is rotated behind the dial face in accordance with the Mach value, and that is visible through a window in the dial face. In order to make the instrument as easy as possible to read, only a small proportion of the Mach scale is revealed by making the window small. It will be appreciated that, since the response of the Mach pressure capsule is normally non-linear, the Mach scale would have to be non-linear, in the same way as the air-speed scale. If this is done, however, over the expanded region of the scale the numbers will be spaced far apart and will make the scale difficult to read, since the window would not be large enough to ensure at least one number is visible. It is desirable therefore to compensate the Mach number output so that its scale can be linear.

It is an object of the present invention to provide an instrument that can be used to effect this compensation.

BRIEF SUMMARY OF THE INVENTION

According to one aspect of the present invention there is provided an indicator instrument for providing an indication of first and second input variables, the instrument including first and second rotatable shafts that are arranged to be rotated by change in said first and second input variables respectively, said first and second shafts being coupled to displace respective first and second indicator means that are arranged to provide a display representation of said input variables, wherein said first shaft is pivotally mounted at a point along its length and is arranged to be angularly displaced about said point, transversely of its length, by change in said second input variable, such that change in said second input variable alters the coupling of said first input variable with said first indicator means.

The second shaft may be connected to the first shaft such that rotation of the second shaft causes angular displacement of said first shaft about said point, transversely of its length. The first shaft may be mounted for angular displacement about its axis on a lever that extends substantially radially of said first shaft, said lever being pivoted for angular displacement about an axis substantially parallel with and separated from the axis of said first shaft. In this respect, the lever may be coupled with said second shaft such that rotation of said second shaft rotates said lever about its pivot and angularly displaces said first shaft about said point. The second shaft may have a radially extending member mounted thereon, said member being pivotally connected to one end of a link member, and the other end of said link member being connected to said lever. The first shaft may have a first arm member fixed therewith and extending radially therefrom, said first arm member being urged into contact with the end of a first finger member, said first finger member being displaced along its length, thereby angularly displacing said first shaft about its axis, in accordance with change in said first input variable, the end of the first finger member providing the point at which said first shaft is pivotally mounted. The first input variable may be derived from deflection of a first pressure capsule, and be representative of Mach number, and the second input variable may be derived from deflection of a second pressure capsule, and be representative of airspeed.

A Mach/airspeed indicator instrument in accordance with the present invention, will now be described, by way of example, with reference to the accompanying drawings.

DETAILED DESCRIPTION

Figure 1:
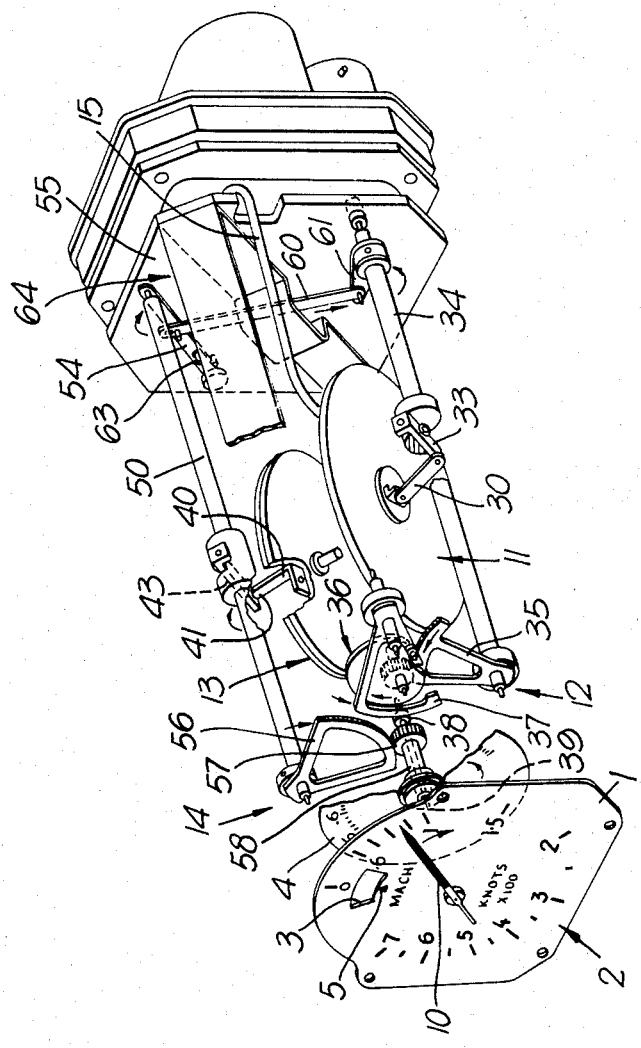
FIG. 1 is a perspective schematic cut away view of the instrument.

With reference to FIG. 1, the instrument is enclosed within a sealed case (not shown) and has a fixed dial plate 1 at its front that is printed around its edge with a scale 2 of air-speed calibrated in knots. The scale 2 is expanded at its lower range, for speeds below about 200 knots. A pointer 10 is driven around the scale 2 in response to deflection of a differential-pressure capsule assembly 11 via a suitable mechanical coupling 12. The fixed dial plate 1 has a window 3 through which a part of a rotatable Mach number scale plate 4 is visible. The Mach number scale plate 4 has a linear scale calibrated in Mach number and can be read against a marker 5 on the fixed dial plate 1 at the edge of the window. A suitable aneroid capsule assembly 13 drives the rotatable plate 4 via a coupling 14.

Figure 3:
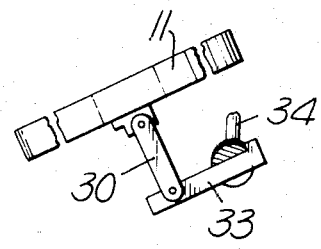
FIG. 3 shows another part of the instrument in greater detail.

With reference now also to FIG. 3, the air-speed pressure capsule assembly 11 is of conventional construction, being formed of two flexible diaphragms sealed together about their edges. One side of the capsule 11 is mounted rigidly on a bulkhead (not shown) of the instrument and is connected to a conduit 15 that extends to the rear of the instrument for connection to the pitot source. On the other side of the capsule 11 a link 30 is pivotally mounted at one end, about a transverse axis, with the capsule. The other end of the link 30 is pivotally attached to one end of an arm 33 which is mounted on and extends laterally of an air-speed drive shaft 34. The shaft 34 extends longitudinally of the instrument and is pivotally mounted at both ends so that it can be rotated about its length. The arm 33 is mounted on the shaft 34 approximately midway along its length and is urged into contact with the link 30 by means of a spring (not shown).

At the forward end of the shaft 34 there is mounted a sector gear 35 the toothed, curved edge of which engages a gear train and cam 36 which in turn drives a second sector gear 37 through a cam follower. The toothed, curved edge of the second sector gear 37 meshes with a small diameter gear wheel 38 mounted at the rear end of a spindle 39. The forward end of the spindle 39 carries the pointer 10 which extends radially towards the scale 2.

Figure 2:
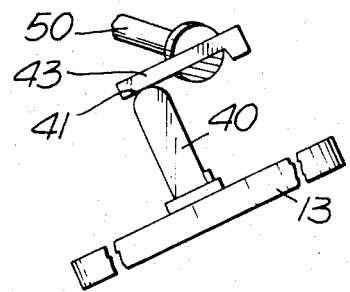
FIG. 2 shows a part of the instrument in greater detail.

The aneroid capsule assembly 13 (FIG. 2) is of a similar form to the air-speed capsule assembly 11 and responds to the static probe pressure in a known way via the indicator sealed case, so as to be responsive to the aircraft altitude. An actuating finger 40 extends from one face of the capsule assembly 13, the finger having a rounded end 41 that provides a camming surface. The rounded end 41 of the finger 40 contacts the underside of an arm 43 which extends radially outwards from a longitudinally-extending Mach shaft 50. The forward end of the Mach shaft 50 is pivotally mounted in fixed jewelled bearings for rotation about its length and for limited angular displacement transversely of its length. The rear end of the shaft 50 is rotatably mounted on a lever 54 that is in turn mounted on the rear bulkhead 55 of the instrument, and the purpose of which will become apparent later. At its forward end, the shaft 50 carries a sector gear 56, the toothed edge of which meshes with a gear wheel 57. The gear wheel 57 is mounted at the rear end of a sleeve 58 which extends co-axially of and is rotatable about the spindle 39. At its forward end, the sleeve 58 carries the Mach number scale plate 4 that is rotated with the sleeve.

The two shafts 34 and 50 are interconnected at the rear end of the instrument by a link 60. One end of the link 60 is pivotally connected to a plate 61 that is fixed to the air-speed shaft 34, so as to be rotated therewith. At its other end, the link 60 is pivotally connected about midway along the lever 54. The lever 54 is journalled on the rear bulkhead 55 at a bearing 63 close to one end, the Mach shaft 50 being supported at its other end 64. The link 60 is coupled to the lever 54 intermediate these points 63 and 64 so that the lever can be rocked about the bearing 63, in a plane transverse of the length of the instrument, by displacement of the link.

In operation, a change in air-speed causes a change in the pressure within the capsule assembly 11 and a corresponding deflection of the link 30. An increase in air-speed causes the link 30 mounted on the air-speed capsule 11 to be deflected outwardly of the capsule thereby producing an anti-clockwise rotation of the air-speed shaft 34. The geometry of the link 30 and the arm 33 is suitably arranged such that deflection of the capsule 11 produces the desired rotation of the air-speed shaft 34. This in turn rotates the sector gears 35 and 37 in the same sense which produces a clockwise rotation of the spindle 39 and a corresponding deflection of the pointer 10 around the scale 2 to higher values of air-speed.

Increase in altitude results in an increase in Mach number as indicated by outward deflection of the aneroid capsule assembly 13 and its actuating finger 40. This produces a clockwise displacement of the arm 43, Mach shaft 50 and its sector gear 56. Rotation of the gear wheel 57, sleeve 58 and the Mach scale plate 4 is produced in the opposite sense, that is, anti-clockwise. The Mach scale plate 4 is printed such that anti-clockwise rotation causes higher values of Mach number to be brought into view through the window 3.

Figure 4:
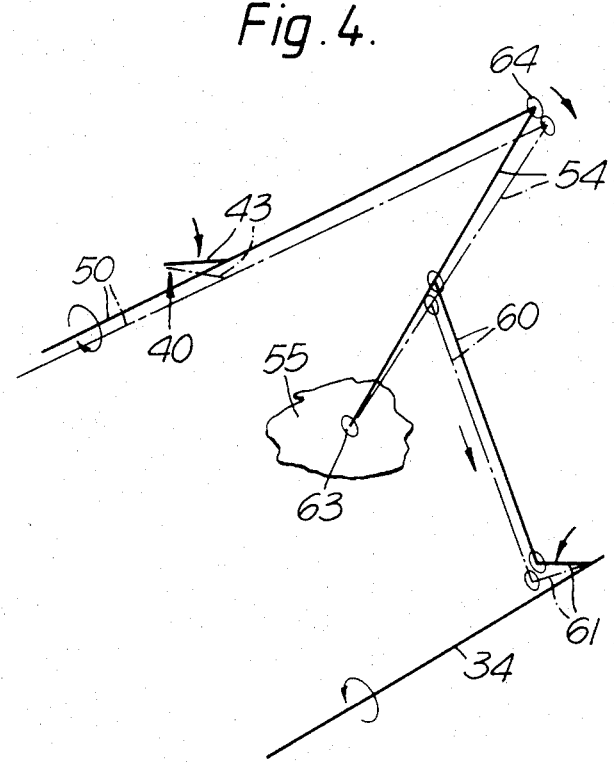
FIG. 4 illustrates the operation of the instrument schematically.

With reference especially to FIG. 4, it will be seen that anti-clockwise rotation of the air-speed shaft 34 causes a corresponding rotation of the plate 61 and a downward displacement of the link 60, substantially along its length. This in turn rotates the lever 54 in a clockwise sense and causes the rear end of the Mach shaft 50 to be displaced downwards in an arc as shown by the broken lines in FIG. 4. It will be appreciated that, since the outer end of the arm 43 on the Mach shaft 50 is restrained from rotation by contact with the finger 40, the effect of transverse displacement of the end of the shaft is to cause angular rotation about its length in a clockwise sense (as well as angular displacement laterally). Thus rotation of the air-speed shaft 34 acts to increase the rotation of the Mach shaft 50 so that the indicated Mach value increases with air-speed - at constant altitude.

For a given amount of rotation of the air-speed shaft 34 the longitudinal displacement of the link 60 will depend on the orientation of the plate 61. Similarly, the lateral displacement of the Mach shaft 50 is dependent on the orientation of the lever 54. By appropriately arranging the orientation of the plate 61 and the lever 54, the desired scaling is produced. In the present instrument, it is arranged such that the Mach scale plate 4 is rotated through a greater angle for a unit change in Mach number, at lower values. In this way, the Mach scale can be arranged in a linear fashion.

The lateral displacement of the Mach shaft 50 need not be caused via rotation of the air-speed shaft 34 but could be caused directly from the air-speed capsule 11 via some other mechanical coupling.

It will be appreciated that the invention is not confined to Mach/air-speed instruments but could be applied to other instruments having two pointers, or other indicators, and in which the coupling of one indicator to its respective input variable is to be varied in accordance with the value of the input variable represented by the other indicator.

I claim:

1. An indicator instrument of the kind for providing an indication of first and second input variables, the instrument including first and second rotatable shafts that are arranged to be rotated by change in said first and second input variables respectively, said first and second shafts being coupled to displace respective first and second indicator means that are arranged to provide a display representation of said input variables, the improvement wherein said first shaft is pivotally mounted at a point along its length for angular displacement about said point, transversely of its length, by change in said second input variable, such that change in said second input variable alters the coupling of said first input variable with said first indicator means.

2. An indicator instrument according to claim 1, including means connecting the said second shaft to the said first shaft such that rotation of the second shaft causes angular displacement of said first shaft about said point, transversely of its length.

3. An indicator instrument according to claim 1, including a lever, means mounting said first shaft on said lever such that said lever extends substantially radially of said first shaft, and means mounting said lever for angular displacement about an axis substantially parallel with and separated from the axis of said first shaft.

4. An indicator instrument according to claim 3, including coupling means, said coupling means coupling said lever with said second shaft such that rotation of said second shaft rotates said lever and angularly displaces said first shaft about said point.

5. An indicator instrument according to claim 4, including a radial member, means mounting said radial member on said second shaft, a link member, means pivotally connecting said radial member to one end of said link member, and means pivotally connecting the other end of said link member to said lever.

6. An indicator instrument according to claim 1, wherein said first and second shafts extend generally parallel to one another.

7. An indicator instrument according to claim 1, including a first arm member, means mounting said first arm member fixedly with said first shaft to extend radially therefrom, a first finger member, the end of said first finger member contacting said first arm member at said point, and means for displacing said first finger member along its length in accordance with change in said first input variable so as thereby angularly to displace said first shaft about its axis.

8. An indicator instrument according to claim 7, wherein the end of said first finger member is shaped to provide a camming surface against said first arm member.

9. An indicator instrument according to claim 1, including a first pressure capsule, and means coupling said first pressure capsule to said first shaft so that deflection of said first pressure capsule provides said first input variable.

10. An indicator instrument according to claim 1, including a second pressure capsule, and means coupling said second pressure capsule to said second shaft so that deflection of said second pressure capsule provides said second input variable.

11. An indicator instrument according to claim 1, including a first scale providing said first indicator, a window, means mounting said scale for rotation behind said window in accordance with change in said first input variable, a pointer providing said second indicator, a second scale, means mounting said second scale coaxial of said first scale, and means mounting said pointer for rotation around said second scale in accordance with change in said second input variable.

12. An indicator instrument according to claim 1, wherein said first input variable is representative of Mach number, and wherein said second input variable is representative of airspeed.

13. A Mach/airspeed indicator instrument comprising: a first pressure capsule the deflection of which is representative of Mach number; a first finger member; means mounting said first finger member on said first pressure capsule; first indicator means that provides a display representation of Mach number; a first shaft; means coupling said first shaft with said first indicator means such that rotation of said first shaft effects displacement of said first indicator means; a first arm member; means mounting said first arm member fixedly on said first shaft to extend radially therefrom to contact said first finger member at a pivot point; a lever; means mounting said first shaft rotatably on said lever, said lever extending substantially radially of said first shaft; means mounting said lever for angular displacement about an axis substantially parallel with and separated from the axis of said first shaft; a second pressure capsule the deflection of which is representative of airspeed; a second shaft extending generally parallel with said first shaft; means coupling said second shaft with said second pressure capsule such that said second shaft is rotated by deflection of said second pressure capsule; second indicator means that provides a display representation of airspeed; means coupling said second shaft with said second indicator means such that rotation of said second shaft effects displacement of said second indicator means; and means coupling said second shaft with said lever such that rotation of said second shaft rotates said lever and thereby displaces said first shaft transversely of its length about said pivot point such that change in airspeed thereby alters the coupling of said first pressure capsule with said first shaft.

* * * * *